2,929,809

NEW COMPLEX METAL COMPOUNDS OF MONOAZO-DYESTUFFS

Karl Menzi and Fritz Oesterlein, Basel, and Bernhard Ruetimeyer, Neu-Allschwil, Switzerland, assignors to Ciba Limited, Basel, Switzerland, a Swiss firm No Drawing. Application August 5, 1957
Serial No. 676,388

Claims priority, application Switzerland August 10, 1956

14 Claims. (Cl. 260—146)

This invention provides new complex metal compounds of monoazo-dyestuffs which contain at least two, and advantageously more than two, acid groups imparting solubility in water and contain bound through a nitrogen bridge a triazine radical of the formula (1) 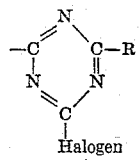

in which R is an —NH₂ group or an etherified hydroxyl group or the radical of an organic monoamine bound to the carbon atom through its amino group and containing at most 13 carbon atoms, and which, if it is aromatic, is substituted by at least one acid group imparting solubility in water as the only salt-forming substituent.

As groups imparting solubility in water the dyestuffs of the present invention may contain sulfonamide groups, alkylsulfone groups and more especially strongly acid groups imparting solubility in water, such as carboxylic acid or sulfonic acid groups. These groups may be distributed in the dyestuff molecule in any desired manner. Thus, two such groups may be present in one of the dyestuff components used for making the dyestuff and the other dyestuff component may be free from such groups, or at least one carboxylic acid or sulfonic acid group may be present in each dyestuff component.

In addition to at least two such groups the metalliferous monoazo-dyestuffs of the invention contain a triazine radical of Formula 1 which is linked to the radical of the diazo-component, or preferably to the radical of the coupling component, through an amino group, for example, through an amino group of the formula

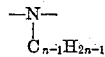

in which $n$ is a whole number.

For the manufacture of the metal compounds of the present invention a metalliferous monoazo dyestuff, more especially a complex nickel, chromium, cobalt or copper compound of an ortho:ortho'-dihydroxy- or ortho-carboxy-ortho'-hydroxymonoazo dyestuff which contains—together with the carboxyl group which is optionally present in ortho-position to the azo linkage and therefore participates in the formation of the complex—at least two acid solubilizing groups and in addition to the groups participating in the complex formation an acylatable amino group, is condensed with a dihalogen compound of the formula (2) 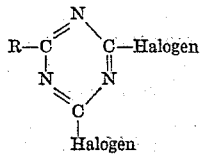

in which R has the meaning defined above in connection with Formula 1 in a manner such that only one of the halogen atoms is replaced.

The dihalogeno-triazine of Formula 2 can be made by such known methods from cyanuric halides such as cyanuric bromide or cyanuric chloride, for example by reacting 1 mol of cyanuric chloride with 1 mol of a reactive organic hydroxyl compound (e.g. with 1 mol of a phenol or alcohol), or with 1 mol of ammonia, or with 1 mol of a monoamine containing at most 13 carbon atoms and comprising a solubilizing group if it has an aromatic nucleus. Suitable compounds of this type are, for example, aliphatic or aromatic hydroxyl compounds such as alcohols or phenols, furthermore methylamine, ethylamine, isopropylamine, methoxyethylamine, methoxypropylamine, cyclohexylamine, dimethyl-, diethyl- or N-methylphenylamine, chloroethylamine, ethanolamines, aminocarbonic acid esters, aminoacetic acid ethyl esters, and above all ammonia, aminoethanesulfonic acid, N-methylaminoethanesulfonic acid, ortho-, meta- or para-aminobenzoic acid, aminobenzenesulfonic acids such as ortho-, meta- or para-aminobenzensulfonic acid, 1-aminobenzene-2:5-disulfonic acid and aminonaphthalene-mono-, di- or -trisulfonic acids.

The metalliferous dyestuffs used as starting materials for the condensation with the resulting primary cyanuric chloride condensation products of Formula 2 can be prepared by known methods, for example by using metallizable monoazo dyestuffs that contain in addition to the grouping capable of forming the metal complex an acylatable amino group, that is to say a primary or secondary amino group linked to the dyestuff molecule directly or via a bridge member, e.g. via an alkylene group or via an SO₂ group. Such metallizable monoazo dyestuffs can be made, for example, by coupling an ortho-hydroxy- or ortho-carboxy-diazo compound of the benzene or naphthalene series, more especially a diazotized ortho-aminophenol such as a chloro- or nitro-ortho-aminophenol, an ortho-aminophenol-mono- or -disulfonic acid or ortho-aminobenzoic acid or a sulfonic acid thereof, with a coupling component that is capable of coupling in vicinal position to a hydroxyl group (or to an enolizable keto group respectively) and contains another such acylatable hydroxyl or amino group or a substituent convertible into such a group. As examples of such coupling components may be mentioned: Resorcinol and dihydroxynaphthalenes, m-aminophenol, 1-aryl-5-pyrazolones containing in the aryl radical an amino group or a substituent convertible into such a group, optionally after manufacture of the dyestuff or after its metallization, such as 1-(2'-, 3'- or 4'-aminophenyl)-3-methyl-5-pyrazolone, 1-(3'- or 4'-aminophenyl)-5-pyrazolone-3-carboxylic acid, furthermore β-ketocarboxylic acid arylamides whose arylide radical contains acylatable amino or hydroxyl groups, and aminonaphthol-sulfonic acids such as 2-amino-8-hydroxy-naphthalene-6-sulfonic acid, 2-N-methylamino-8-hydroxy-naphthalene-6-sulfonic acid, 2-alkylamino-5-hydroxynaphthalene-7-sulfonic acid, 2-amino-5-hydroxynaphthalene-7-sulfonic acid, 2-(3'-or 4'-aminobenzoylamino)-5-hydroxynaphthalene-7-sulfonic acid, 2-(4'-acetylaminophenyl-amino)-5-hydroxynaphthalene-7-sulfonic acid or 2-(4'-aminophenylamino) - 5-hydroxynaphthalene-3':7 - disulfonic acid. In selecting the diazo and coupling components it must be ensured that the finished dyestuff contains at least two acid solubilizing groups. Useful dyestuffs are obtained also by reducing ortho:ortho'-dihydroxy-monoazo dyestuffs containing nitro groups or ortho-carboxy - ortho'-hydroxy-monoazo dyestuffs containing nitro groups, or by hydrolysing metallizable monoazo dyestuffs containing acylamino groups, e.g. by splitting the acyl group of dyestuffs accessible from ortho-hydroxydiazo compounds of the benzene series that contain acyl-amino groups and the aforementioned coupling components. The hydrolysis can be performed, if desired, during or after the metallization of the dyestuffs.

The conversion of the dyestuffs obtained from the aforesaid components into the complex metal compounds to be used as starting materials in the present process can be performed with dyestuffs such as are present in the coupling mixture.

Suitable metal-yielding agents are, for example, those which yield manganese, iron, aluminum, and above all cobalt, chromium, copper and nickel.

The metal compounds thus obtained may contain one atom of metal for every one or two monoazo dyestuff molecules. When copper or nickel is used as the metal-yielding agent there are preferably formed, for example, compounds that contain one atom of metal for every molecule of monoazo dyestuff, whereas when chromium and especially cobalt is used, also the 1:2 types are readily accessible and especially valuable.

Suitable metal-yielding agents are, for example, salts that contain the afore-mentioned metals as the cation such, for example, as chromium sulfates, cobalt acetate, cobalt sulfate, copper sulfate or copper acetate. In some cases it is of advantage to use a complex metal compound, e.g. in the form of a metal-amine complex such as copper-tetramine sulfates from ammonia, pyridine or monoethanolamine, or in the form of compounds in which one of the afore-mentioned metals is bound in complex union in the anion, e.g. complex chromium compounds of organic hydroxycarboxylic acids, such as salicylic acid or complex cobalt or copper compounds of the alkali metal salts of aliphatic aminocarboxylic acids or hydroxycarboxylic acids such as glycine, lactic acid and above all tartaric acid, such as sodium-copper tartrate.

The treatment with the metal-yielding agent can be performed by a known method, e.g. by heating at a temperature ranging from 50 to 120° in an open vessel, e.g. while refluxing, or optionally in a closed vessel under pressure, the pH value being dictated by the chosen metallization method; for example, acid coppering is performed with copper sulfate, alkaline coppering with copper tetramine sulfate. If desired, the metallization can be performed in the presence of a solvent, such, for example, as alcohol, dimethyl formamide or the like.

Alternatively, the metalliferous parent dyestuffs can be made by metallizing and simultaneously reducing ortho: ortho'-dihydroxy-monoazo or ortho-carboxy-ortho'-hydroxy-monoazo dyestuffs containing nitro groups and comprising at least two acid solubilizing groups, or by subsequent reduction of the nitro groups of complex metal compounds of nitrated monoazo dyestuffs.

The condensation, according to the invention, of these complex metal compounds of monoazo dyestuffs with the dihalogeno-triazine compounds of Formula 2 is advantageously performed in the presence of an acid-acceptor such as sodium acetate, sodium hydroxide or carbonate and under conditions such that one exchangeable halogen atom is left in the finished product, that is to say, for example, in the presence of an organic solvent or at a relatively low temperature in an aqueous medium.

The resulting condensation products of metalliferous monoazo dyestuffs can also be made by a modification of the process described above. According to said modification a metalliferous monoazo dyestuff containing an acylatable amino group and at least two acid solubilizing groups, e.g. two sulfonic acid groups, is condensed with a cyanuric halide, especially cyanuric chloride, in the molecular proportion of 1:1 and in the resulting primary condensation product, which contains two exchangeable halogen atoms, a further halogen atom is reacted with ammonia, or with an organic hydroxyl compound, or with an organic monoamine containing at most 13 carbon atoms which, if it is aromatic, is substituted by carboxyl or sulfonic acid groups, in a manner such that metalliferous monoazo dyestuffs are formed that contain in addition to at least two sulfonic acid groups one exchangeable halogen atom.

Hydroxyl compounds and monoamines suitable for the above mentioned purpose are those which have been mentioned herein-before in connection with the manufacture of the dihalogeno-triazines. As metalliferous monoazo dyestuffs for this purpose those mentioned hereinbefore are likewise suitable, and also in this case the manufacture and processing of the dyestuff condensation products is conducted so that the isolated final product contains a reactive halogen atom, that is to say, in an aqueous medium at as low a temperature as possible, and in the presence of an acid-binding agent or optionally in an organic solvent.

According to a further modification of the present process the condensation with the specified dihalogeno-triazine compounds of Formula 2 can be performed, if desired, before the dyestuff is metallized, if the dyestuff used is so easy to metallize that the last halogen atom of the metal-free dyestuff condensation product is not attacked.

The dyestuffs obtained by the above-described process and its modifications are new; they are valuable dyestuffs suitable for dyeing and printing a wide variety of materials, more especially polyhydroxylated fibrous materials such as wood pulp, regenerated cellulose or viscose, linen and especially cotton. They can be used for dyeing by the so-called direct dyeing method, by the printing method, or by the pad-dyeing process, more especially for dyeing from an alkaline aqueous solution which optionally may be strongly salted, e.g. by the method according to which the dyestuff is fixed on the material to be dyed with an acid-binding agent.

Notwithstanding the presence of unstable halogen atoms in these dyestuffs they can be isolated and made up into useful, dry dye preparations without impairing their valuable properties. The isolation is advantageously performed at a low temperature by salting out and filtration. The filtered dyestuffs can be dried, if desired after the addition of diluents; the drying is preferably carried out at not too high a temperature and under diminished pressure. By spray-drying the whole manufacturing mixture it is in some cases possible to produce the dry preparations directly, that is to say without intermediate isolation of the dyestuff. By this method new, valuable dry preparations are obtained which are suitable for making stock solutions or dyebaths, optionally also for making printing pastes.

The dyeings obtained with the new dyestuffs on cellulosic fibers are as a rule distinguished by good fastness to light and especially by outstanding wet fastness.

Unless otherwise indicated, parts and percentages in the following examples are by weight, and temperatures are in degrees centigrade.

*Example 1*

26.9 parts of 1-hydroxy-2-aminobenzene-4:6-disulfonic acid are dissolved in the form of the disodium salt in 300 parts of water, 25 parts of 30% hydrochloric acid are added, and diazotized at 0–5° C. by dropping in a solution of 6.9 parts of sodium nitrite in 20 parts of water.

This diazo solution is run in at 0–10° C. into 23.9 parts of 2-amino-5-hydroxynaphthalene-7-sulfonic acid and 25 parts of sodium carbonate in 500 parts of water. On completion of the coupling reaction the reaction mixture is adjusted with hydrochloric acid to pH=6.5 to 7.5. 16.4 parts of anhydrous sodium acetate are added, and the whole is heated to 70–80° C. 100 parts by volume of 1-molar copper sulfate solution are added dropwise, the temperature is maintained for 1 hour at 70–80° C., sodium chloride is added to isolate the dyestuff, the mixture is allowed to cool to room temperature, and the copper complex is filtered off.

For the condensation with cyanuric chloride the filter paste of the coppered aminoazo dyestuff is dissolved in 400 parts of water, the pH is adjusted to 7 by cautiously adding dilute sodium hydroxide solution, and while keeping the solution well stirred a solution of 18.5 parts of cyanuric chloride in a little acetone is tipped in at 0–5° C.; during the condensation the pH is maintained at about 7 by dropping in 100 parts by volume of 1 N-sodium hydroxide solution.

To exchange the second chlorine atom of the cyanuric chloride for an amino group, 100 parts of 5% ammonia solution are added to the reaction mixture, and the whole is stirred for 2 hours at about 40° C., neutralized with hydrochloric acid, and the new dyestuff is salted out with sodium chloride, filtered off and dried in vacuo at 60–70° C.

The new dyestuff dyes cellulose fibers by the processes described in Examples 23 and 24 ruby red tints of very good fastness to light and washing.

Dyestuffs of similar properties are obtained when the ammonia is replaced by an equivalent amount of methylamine or ethylamine.

When the metallization is performed, instead of with copper sulfate, with an equivalent amount of nickel sulfate, brownish red tints are obtained on cellulose fibers, having very good fastness to washing and outstanding fastness to light.

More bluish tints are obtained with dyestuffs in which 2-amino-5-hydroxynaphthalene-7-sulfonic acid has been replaced by an equivalent amount of 2-amino-8-hydroxynaphthalene-6-sulfonic acid; these dyestuffs are particularly suitable for pad-dyeing as described in Example 23.

*Example 2*

43.9 parts of the monoazo dyestuff obtained by alkaline coupling of diazotized 1-hydroxy-2-aminobenzene-4-sulfonic acid and 2-amino-5-hydroxynaphthalene-7-sulfonic acid are dissolved in 750 parts of water at 70–80° C. Coppering is performed by adding 16.4 parts of anhydrous sodium acetate and 100 parts by volume of 1-molar copper sulfate solution, the temperature being maintained for 1 hour at 70–80° C. By adding sodium chloride the copper complex is completely precipitated, filtered off, and washed on the filter with cold water containing sodium chloride.

For the condensation with cyanuric chloride the filter paste of the coppered aminoazo dyestuff is dissolved in 500 parts of water and adjusted to pH=7 by cautiously adding dilute sodium hydroxide solution. While stirring the whole well, a solution of 18.5 parts of cyanuric chloride in a little acetone is tipped in at 0–5° C., and during the condensation the pH is kept at 7 by dropping in 100 parts by volume of 1 N-sodium hydroxide solution.

To prepare the secondary condensation product the reaction mixture is treated with 17.3 parts of 1-aminobenzene-4-sulfonic acid and 200 parts by volume of 1 N-sodium hydroxide solution. The whole is stirred at 30–40° to complete the reaction, i.e. until the pH is once more 7. The dyestuff is then salted out with sodium chloride, filtered off and dried in vacuo at 60–70° C.

The new dyestuff dyes cellulose fibers by the processes described in Examples 23 and 24 ruby red tints of very good fastness to light and washing.

When 1-aminobenzene-4-sulfonic acid is replaced by an identical amount of 1-aminobenzene-3-sulfonic acid, a dyestuff of similar properties is obtained.

The identical dyestuffs are obtained when cyanuric chloride is first condensed with the aminobenzene-sulfonic acid and then reacted with the coppered ortho:ortho'-dihydroxyaminoazo dyestuff.

*Example 3*

46.7 parts of the monoazo dyestuff obtained by alkaline coupling of 1-carboxy-2-aminobenzene-4-sulfonic acid and 2-amino-5-hydroxynaphthalene-7-sulfonic acid are dissolved in 500 parts of water at 70–80° C. The coppering is performed by adding 16.4 parts of anhydrous sodium acetate and 100 parts by volume of 1-molar copper sulfate solution, and the temperature is maintained for 1 hour at 70–80° C. The copper complex is completely salted out with sodium chloride, filtered off and washed on the filter with cold salt water.

For the condensation with cyanuric chloride and the manufacture of the secondary condensation product with 1-aminobenzene-4-sulfonic acid the procedure is as described in paragraphs 2 and 3 of Example 2.

The new dyestuff dyes cellulose fibers by the methods described in Example 23 and 24 brown-red tints of good fastness to washing and light.

*Example 4*

49.1 parts of the monoazo dyestuff obtained by alkaline coupling of 1-carboxy-2-aminobenzene and 2-(4'-aminobenzoyl)-amino-5-hydroxynaphthalene-7-sulfonic acid are dissolved in 1000 parts of water at 70–80° C. The coppering is performed by adding 16.4 parts of anhydrous sodium acetate and 100 parts by volume of 1-molar copper sulfate solution and the temperature is maintained for 1 hour at 70–80° C. The copper complex is completely salted out with sodium chloride, filtered off and washed on the filter with cold salt water.

For the condensation with cyanuric chloride the filter paste of the coppered aminoazo dyestuff is dissolved in 750 parts of water, and the pH is adjusted to 7 by cautiously adding dilute sodium hydroxide solution. A solution of 18.5 parts of cyanuric chloride in a little acetone is tipped in at 0–5° C. with vigorous stirring. During the condensation the pH is maintained at about 7 by dropping in 100 parts by volume of 1 N-sodium hydroxide solution.

To exchange the second chlorine atom of the cyanuric chloride for an amino group 100 parts of 5% ammonia solution are added to the reaction mixture, and the whole is stirred for 2 hours at about 40° C. The whole is neutralized with hydrochloric acid, and the new dyestuff is salted out with sodium chloride and dried in vacuo at 60–70° C.

The new dyestuff dyes cellulose fibers by the direct dyeing method according to Example 23 russet tints of good fastness to light and washing.

Similar dyestuffs are obtained when 1-carboxy-2-aminobenzene is replaced by 1-carboxy-4- or -5-chloro-2-aminobenzene.

When copper sulfate is replaced by an equivalent amount of nickel sulfate, compounds are obtained that yield more yellowish tints.

*Example 5*

65.2 parts of the monoazo dyestuff obtained by alkaline coupling of 1-hydroxy-2-amino-6-acetylaminobenzene-4-sulfonic acid with 2-(3'-sulfophenyl)-amino-5-hydroxynaphthalene-7-sulfonic acid are heated, for hydrolysis of the acetylamino group, for 1 hour at 90 to 95° C. in 1000 parts of 5% sodium hydroxide solution. The reaction mixture is allowed to cool off slightly and then neutralized with hydrochloric acid.

Coppering is performed with 16.4 parts of anhydrous sodium acetate and 100 parts by volume of 1-molar copper sulfate solution and the temperature is maintained for 1 hour at 70 to 80° C. The copper complex is completely precipitated with sodium chloride, filtered off and washed on the filter with cold salt water.

For the condensation with cyanuric chloride and the manufacture of the secondary condensation product with ammonia the procedure described in paragraphs 3 and 4 of Example 1 is used.

The new dyestuff dyes cellulose fibers by the method described in Example 23 reddish violet tints of good fastness to washing and light.

Example 6

45.3 parts of the monoazo dyestuff obtained by alkaline coupling of diazotized 2-amino-4-methyl-1-hydroxybenzene-5-sulfonic acid with 2-amino-5-hydroxynaphthalene-7-sulfonic acid are dissolved in 750 parts of water at 70–80° C. Coppering is performed by adding 16.4 parts of anhydrous sodium acetate and 100 parts by volume of 1-molar copper sulfate solution, and the temperature is maintained for 1 hour at 70–80° C. The copper complex is completely precipitated with sodium chloride, filtered off and washed on the filter with cold salt water.

Condensation with cyanuric chloride and the manufacture of the secondary condensation product with 1-aminobenzene-3-sulfonic acid are performed as described in Example 2, paragraphs 2 and 3.

The new dyestuff dyes cellulose fibers by the processes described in Examples 23 and 24 reddish violet tints of good fastness to washing and light.

Similar dyeings are obtained by using dyestuffs obtained in analogous manner from 4-chloro-2-amino-1-hydroxybenzene-6-sulfonic acid or from 6-nitro-2-amino-1-hydroxybenzene-4-sulfonic acid, whereas the corresponding dyestuff from 4-nitro-2-amino-1-hydroxybenzene-6-sulfonic acid produces ruby red dyeings.

Example 7

The diazo compound from 23.9 parts of 1-amino-2-hydroxynaphthalene-4-sulfonic acid is added to 23.9 parts of 2-amino-5-hydroxynaphthalene-7-sulfonic acid and 100 parts by volume of 2 N-sodium hydroxide solution and coupled at 15–20° C. On completion of the coupling, the dyestuff is precipitated with sodium chloride. The dyestuff is purified by repeated dissolution and precipitation with sodium chloride, and it is dissolved in 750 parts of water at 70–80° C. Coppering is performed by adding 16.4 parts of anhydrous sodium acetate and 100 parts by volume of 1-molar copper sulfate solution, and the temperature is maintained for 1 hour at 70–80° C. The copper complex is salted out with sodium chloride and filtered off.

For condensation with cyanuric chloride and the manufacture of the secondary condensation product with 1-aminobenzene-3-sulfonic acid the procedure described in paragraphs 2 and 3 of Example 2 is used.

The new dyestuff dyes cellulose fibers by the processes described in Examples 23 and 24 bluish violet tints of good fastness to washing and light.

Example 8

56.0 parts of the monoazo dyestuff obtained by alkaline coupling of diazotized 5-nitro-2-amino-1-hydroxybenzene with 2-(4′-aminophenyl)-amino-5-hydroxynaphthalene-7:3′-disulfonic acid are dissolved in 750 parts of water at 70–80° C. Coppering is performed by adding 16.4 parts of anhydrous sodium acetate and 100 parts by volume of 1-molar copper sulfate solution and the temperature is maintained for 1 hour at 70–80° C. The precipitated copper complex is filtered off and washed with water.

The condensation with cyanuric chloride and the manufacture of the secondary condensation product with 1-aminobenzene-3-sulfonic acid are performed as described in paragraphs 2 and 3 of Example 2.

The new dyestuff dyes cellulose fibers by the processes described in Examples 23 and 24 reddish blue tints of good fastness to washing and light.

When 1-aminobenzene-3-sulfonic acid is replaced by 1-aminobenzene-2- or -4-sulfonic acid or by 1-aminobenzene-2:5-disulfonic acid, dyestuffs of similar properties are obtained.

Example 9

17.3 parts of 1-aminobenzene-3-sulfonic acid in the form of its sodium salt are dissolved in 100 parts of water. While stirring well, a solution of 18.5 parts of cyanuric chloride in a little acetone is tipped in, and by adding ice it is ensured that the temperature does not rise above +5° C. During the condensation, which is complete after about 15 minutes, the pH is constantly kept at about 7 by the dropwise addition of 100 parts by volume of 1 N-sodium hydroxide solution.

To exchange the second chlorine atom of the cyanuric chloride, a solution of 23.9 parts of 2-amino-5-hydroxynaphthalene-7-sulfonic acid (in the form of its sodium salt) in 200 parts of water is added to the suspension of the monocondensation product, and the temperature is raised to 35–40° C. During this reaction, which takes 2–3 hours, the pH is kept constant at 3–4 by dropping in sodium hydroxide solution. The secondary condensation product is isolated by rendering the mixture acid to Congo with hydrochloric acid and adding sodium chloride. The white crystalline mass is filtered off and washed on the filter with salt water.

To form the dyestuff, the resulting filter paste is dissolved in 200 parts of water while adding sodium hydroxide until alkaline reaction to brilliant yellow paper has been achieved. At 0–5° C. a diazo solution of 18.9 parts of 1-hydroxy-2-aminobenzene-4-sulfonic acid prepared in the usual manner with sodium nitrite and hydrochloric acid and neutralized with sodium carbonate is added, and while stirring, an aqueous solution of 4 parts of sodium hydroxide is dropped in in the course of 3 hours.

On completion of the coupling, coppering is performed by adjusting the pH of the coupling solution with acetic acid to 7, the mixture is heated to 50–55° C. and 16.4 parts of anhydrous sodium acetate and then 100 parts by volume of 1-molar copper sulfate solution are added. The temperature is maintained for ½ hour at 50–55°, the metal complex is salted out with sodium chloride, filtered off, washed on the filter with salt water and dried in vacuo at 70–80° C.

The dyestuff prepared in this manner is identical with the corresponding product described in Example 2, it dyes cellulose fibers by the processes described in Examples 23 and 24 ruby red tints of good fastness to light and washing.

Similar dyestuffs are obtained when in the above example the specified 17.3 parts of 1-aminobenzene-3-sulfonic acid are replaced by an equivalent amount of 2-chloro- or 2-methyl-1-aminobenzene-5-sulfonic acid or by a corresponding amount of methylamine, γ-methoxypropylamine, isopropylamine or morpholine.

Example 10

21.7 parts of 1-carboxy-2-aminobenzene-4-sulfonic acid are dissolved in the form of its disodium salt in 200 parts of water, 25 parts by volume of 30% hydrochloric acid are added, and diazotization is performed by dropping in 6.9 parts of sodium nitrite in 20 parts of water, at 0–5° C. 45.1 parts of the coupler of the formula

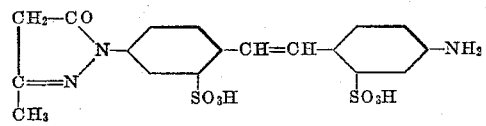

are dissolved, together with 30 parts of sodium carbonate, in 250 parts of water, and while stirring well, the diazo solution is added at 0–5° C.

On completion of the formation of the dyestuff the coupling solution is neutralized with acetic acid, heated to 70–80° C., 16.4 parts of anhydrous sodium acetate and then 100 parts by volume of 1-molar copper sulfate solution are added, and the temperature is maintained for 1 hour at 70–80° C.

For condensation with cyanuric chloride the reaction mixture is cooled to 0–5° C., adjusted to pH=7 with sodium hydroxide solution, and while stirring well, a solution of 18.5 parts of cyanuric chloride in a little warm acetone is tipped in. During the condensation the pH is maintained at about 7 by dropping in 100 parts by volume of 1 N-sodium hydroxide solution.

To exchange a second reactive chlorine atom of the cyanuric chloride for an amino group, 40 parts of 10% ammonia solution are added to the reaction mixture, and the temperature is maintained for 4 hours at 30–35° C. The mixture is then carefully neutralized with hydrochloric acid, and the dyestuff is salted out with sodium chloride, filtered off, washed on the filter with salt water, and dried in vacuo at 60–70° C.

The new dyestuff dyes cellulose fibers by the direct dyeing method described in Example 16, and especially intensively by the pad-dyeing method according to Example 24, greenish yellow tints of very good fastness to light and washing.

A very similar dyestuff is obtained when the metallization is performed, instead of with copper sulfate, with an equivalent amount of nickel sulfate.

Similar dyestuffs are also obtained by reacting the second reactive chlorine atom of the cyanuric chloride with aminobenzene, 1-aminobenzene-2-, -3- or -4-sulfonic acid or with 1-carboxy-2-aminobenzene, instead of with ammonia, the procedure involved being the same as has been described in the 3rd paragraph of Example 2.

Slightly more reddish dyeings are obtained with the dyestuffs that contain as diazo component, instead of 1-carboxy-2-aminobenzene-4-sulfonic acid, the isomeric 5-sulfonic acid or 1-carboxy-2-aminobenzene.

*Example 11*

18.9 parts of 1-hydroxy-2-aminobenzene-4-sulfonic acid are dissolved in the form of its sodium salt in 250 parts of water, 25 parts by volume of 30% hydrochloric acid are added, and diazotization is performed by dropping in at 5–12° 6.9 parts of sodium nitrite in 20 parts of water.

Coupling is performed by dissolving 45.1 parts of the pyrazolone of the formula

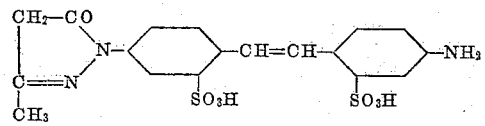

together with 30 parts of sodium carbonate, in 250 parts of water, and while stirring this solution well, it is combined at 0–5° with the diazo solution.

On completion of the formation of the dyestuff the coupling solution is neutralized with acetic acid, heated to 70–80° C., and 16.4 parts of anhydrous sodium acetate and then 100 parts by volume of 1-molar copper sulfate solution are added, and the temperature is maintained for 1 hour at 70–80° C.

In the meantime a primary cyanuric chloride condensation product is prepared as follows:

17.3 parts of 1-aminobenzene-2-sulfonic acid are dissolved in the form of its sodium salt in 100 parts of water. While stirring well, a solution of 18.5 parts of cyanuric chloride in a little warm acetone is tipped in, and by adding ice the temperature is prevented from rising above +5° C. During the condensation, which takes about 20 minutes, the pH is kept constant at about 7 by dropping in 100 parts by volume of 1 N-sodium hydroxide solution.

To manufacture the secondary condensation product the solution of the coppered aminoazo dyestuff is adjusted to pH=7 by adding sodium hydroxide, the suspension of the primary cyanuric chloride condensate is run in, and the whole is heated to 30–40° C.; during the reaction the pH is maintained at about 7 by adding sodium hydroxide solution.

On completion of the condensation the dyestuff is salted out with sodium chloride, filtered off, washed with salt water and dried in vacuo at 60–70° C.

The new dyestuff produces on cellulose fibers by the dyeing processes described in Examples 23 and 24 yellowish brown tints of good fastness to washing and light.

*Example 12*

59.9 parts of the monoazo dyestuff obtained by alkaline coupling of diazotized 1-hydroxy-2-aminobenzene-4:6-disulfonic acid with 1-hydroxy-8-aminonaphthalene-3:6-disulfonic acid are dissolved in 750 parts of water at 70–80° C. Coppering is performed by adding 16.4 parts of anhydrous sodium acetate and 100 parts by volume 1-molar copper sulfate solution, and the temperature is maintained for 1 hour at 70–80° C. The copper complex is salted out with sodium chloride, filtered off and washed on the filter with cold salt water.

For condensation with cyanuric chloride the filter paste of the coppered azo dye is dissolved in 500 parts of water and adjusted to pH=7 by carefully adding dilute sodium hydroxide solution. At 0–5° C., while stirring well, a solution of 18.5 parts of cyanuric chloride in a little warm acetone is tipped in, and during the condensation the pH is maintained at about 7 by dropping in 100 parts by volume of 1 N-sodium hydroxide solution.

To prepare the secondary condensation product the reaction mixture is treated with 17.3 parts of 1-aminobenzene-4-sulfonic acid and 200 parts by volume of 1 N-sodium hydroxide solution. The mixture is stirred at 30–40° until the reaction is complete, that is to say until the pH is again 7; the dyestuff is salted out with sodium chloride and potassium chloride, filtered off, and dried in vacuo at 60–70° C.

The new dyestuff dyes cellulose fibers particularly advantageously by the pad-dyeing process described in Example 24 violet tints of good fastness to washing and light.

When the metallization is performed—instead of with copper sulfate—with an equivalent amount of nickel sulfate, a compound is obtained which gives reddish violet dyeings of similarly good fastness to washing and light.

When in the manufacture of the secondary condensation product 1-aminobenzene-4-sulfonic acid and 1 N-sodium hydroxide solution are replaced by 40 parts of 10% ammonia solution and, prior to the isolation of the dyestuff, the reaction mass is adjusted to pH=7 by carefully adding dilute hydrochloric acid, dyestuffs of similar properties are obtained.

*Example 13*

48.1 parts of the monoazo dyestuff obtained by alkaline coupling of diazotized 1-hydroxy-2-amino-6-acetylaminobenzene-4-sulfonic acid with 2-hydroxynaphthalene-6-sulfonic acid are heated for 1 hour at 90–95° C. in 500 parts of 5% sodium hydroxide solution to hydrolyse the acetylamino group. The reaction mixture is allowed to cool slightly and neutralized with hydrochloric acid. The dyestuff is salted out with sodium chloride, filtered off, and washed on the filter with salt water.

Coppering is performed by dissolving the filter paste in 500 parts of water, 16.4 parts of anhydrous sodium acetate and 100 parts by volume of 1-molar copper sulfate solution are added, and the temperature is maintained for 1 hour at 70–80° C.

In the meantime, a primary cyanuric chloride condensation product is prepared as follows:

17.3 parts of 1-aminobenzene-3-sulfonic acid are dissolved in the form of its sodium salt in 100 parts of water. While stirring well, a solution of 18.5 parts of cyanuric chloride in a little warm acetone is tipped in, and by adding ice it is ensured that the temperature does not rise above +5° C. During the condensation, which takes about 15 minutes, the pH is kept constant at about 7 by dropping in 100 parts by volume of 1 N-sodium hydroxide solution.

To manufacture the secondary condensation product, the solution of the coppered aminoazo dyestuff is adjusted to pH=7 by adding sodium hydroxide solution; the suspension of the primary cyanuric chloride condensation product is run in, and the mixture is heated at 30–40° C. During the reaction the pH is maintained at about 7 by adding sodium hydroxide solution.

On completion of the condensation the dyestuff is salted out with sodium chloride, filtered off, and washed on the filter with salt water and dried in vacuo at 60–70° C.

The new dyestuff produces on cellulose fibers by the dyeing methods described in Examples 23 and 24 bluish red tints of good fastness to washing and light.

When 1-aminobenzene-3-sulfonic acid is replaced by an identical amount of the isomeric 2- or 4-sulfonic acid or by an equivalent amount of 1-aminobenzene-2:5-disulfonic acid or 2-methoxy-1-aminobenzene-5-sulfonic acid, similar dyestuffs are obtained.

By replacing copper sulfate by an equivalent amount of nickel sulfate, dyestuffs are obtained that produce brownish red tints.

*Example 14*

49.6 parts of the monoazo dyestuff obtained by alkaline coupling of diazotized 1-hydroxy-2-amino-6-acetyl-aminobenzene-4-sulfonic acid with 2-amino-5-hydroxy-naphthalene-7-sulfonic acid are heated for 1 hour at 90–96° in 800 parts of 4% sodium hydroxide solution to hydrolyse the acetylamino group. The reaction mixture is allowed to cool off slightly and then neutralized with hydrochloric acid. The aminoazo dyestuff is salted out with sodium chloride, filtered off, and washed on the filter with salt water.

Coppering is performed by dissolving the filter paste in 700 parts of water, 16.4 parts of anhydrous sodium acetate and 100 parts of 1-molar copper sulfate solution are added, and the temperature is maintained for 1 hour at 70–80° C. The copper complex is precipitated with sodium chloride, filtered off and washed on the filter with salt water.

In the meantime a primary cyanuric chloride condensation product is prepared as follows:

34.6 parts of 1-aminobenzene-3-sulfonic acid are dissolved in the form of its sodium salt in 200 parts of water. While stirring well, a solution of 37 parts of cyanuric chloride in a little warm acetone is tipped in, and by adding ice it is ensured that the temperature does not rise above +5° C. During the condensation, which takes about 15 minutes, 200 parts by volume of 1 N-sodium hydroxide solution are dropped in so as to maintain the pH constant at about 7.

To prepare the secondary condensate the filter paste of the coppered diaminoazo dyestuff is stirred in 700 parts of water, the suspension of the primary cyanuric chloride condensate is run in, the whole is heated to 30–40°, and during the reaction the pH is maintained at about 7 by adding sodium hydroxide solution.

On completion of the condensation the dyestuff is salted out with sodium chloride, filtered off, washed on the filter with salt water, and dried in vacuo at 60–70°.

The new dye dyes cellulose fibers particularly well by the direct dyeing method described in Example 23 bluish red tints of good fastness to washing and light.

When copper sulfate is replaced by an equivalent amount of nickel sulfate, a dyestuff is obtained that produces brownish red tints.

*Example 15*

51.1 parts of the monoazo dyestuff obtained by alkaline coupling of diazotized 1-hydroxy-2-amino-6-acetyl-aminobenzene-4-sulfonic acid with 1-phenyl-3-methyl-5-pyrazolone-4'-sulfonic acid are heated for 2 hours at 90–95° C. in 1000 parts of 4% sodium hydroxide solution to hydrolyse the acetylamino group. After cooling, the aminoazo dyestuff is precipitated with hydrochloric acid and sodium chloride and filtered off.

To prepare the 2:1 cobalt compound the dyestuff is dissolved in 200 parts of water and 100 parts of 2 N-sodium hydroxide solution and heated to 70° C.; 100 parts of a cobalt sulfate solution of a cobalt content of 3.25% are added, and cobalting is performed for ½ hour at 70–80° C.

To prepare the monochloro-triazine derivative the dyestuff solution of the cobalt complex compound is cooled to 0° C. and adjusted to pH=7. At 0–5°, while stirring well, a solution of 18.5 parts of cyanuric chloride in a little acetone is added, and a pH of 7 is maintained by dropping in 50 parts of 2 N-sodium hydroxide solution.

To exchange the second chlorine atom of the cyanuric chloride for an amino group the reaction mixture is mixed with 100 parts of 2 N-ammonia solution and stirred for 3 hours at 35–40° C. Evaporation in vacuo at 40–50° yields a brown powder which dyes cellulose fibers by the process described in Example 24 yellowish brown tints.

*Example 16*

51.1 parts of the monoazo dyestuff obtained by alkaline coupling of diazotized 1-hydroxy-2-amino-6-acetyl-aminobenzene-4-sulfonic acid with 1-phenyl-3-methyl-5-pyrazolone-4'-sulfonic acid are heated for 2 hours at 90–95° in 1000 parts of 4% sodium hydroxide solution to hydrolyse the acetyl group. After cooling, the aminoazo dyestuff is isolated with hydrochloric acid and sodium chloride and then filtered off.

To prepare the 2:1 chromium compound the dyestuff is dissolved in 200 parts of water at 80°, and 120 parts of a solution of sodium chrome-salicylate, having a chromium content of 2.6%, are added. Refluxing for 4 hours complete the chroming.

To prepare the monochloro-triazine derivative the dyestuff solution of the complex chromium compound is cooled to 0° C. and adjusted to pH=7. At 0–5°, while stirring well, a solution of 18.5 parts of cyanuric chloride in a little acetone is added, and the pH is maintained at 7 by dropping in 50 parts of 2 N-sodium hydroxide solution.

To exchange the second chlorine atom of the cyanuric chloride for an amino group 100 parts of 2 N-ammonium solution are added to the reaction mixture which is then stirred for 3 hours at 35–40° C. Evaporation in vacuo at 40–50° C. yields a brown powder which dyes cellulose fibers by the method described in Example 24 brownish orange tints.

*Example 17*

61.3 parts of the monoazo dyestuff obtained by alkaline coupling of diazotized 1-hydroxy-2-aminobenzene-4-sulfonic acid with 2-(4'-aminophenyl)-amino-5-hydroxy-naphthalene-3':7-disulfonic acid are dissolved in 500 parts of water with the addition of 100 parts of 2 N-sodium hydroxide solution at 70° C., and a cobalt sulfate solution containing 3.25% of cobalt is added. Stirring for ½ hour at 70–80° completes the cobalting.

The complex cobalt compound is isolated by neutralizing with dilute acetic acid and adding sodium chloride and is filtered off.

To prepare the monochloro-triazine derivative the resulting moist 2:1 cobalt compound is stirred in 200 parts of water and adjusted with sodium hydroxide solution to pH=7. At 0–5°, while stirring well, a solution of 18.5 parts of cyanuric chloride in a little acetone is added and the pH is maintained at 7 by dropping in 50 parts of 2 N-sodium hydroxide solution.

To exchange the second chlorine atom of the cyanuric chloride for an amino group the reaction mixture is treated with 100 parts of 2 N-ammonia solution and stirred for 3 hours at 35–40° C. The dyestuff is isolated with sodium chloride, filtered off and dried at 50° C.

On cellulose fibers the new dyestuff produces by the method according to Example 24 violet-brown tints of good fastness to washing and light.

Example 18

61.3 parts of the monoazo dyestuff obtained by alkaline coupling of diazotized 1-hydroxy-2-aminobenzene-4-sulfonic acid with 2-(4'-aminophenyl)-amino-5-hydroxynaphthalene-3':7-disulfonic acid are dissolved in 500 parts of water at 80° C. and 120 parts of a solution of sodium chrome-salicylate (chromium content 2.6%) are added. Refluxing for 4 hours completes the chroming.

The complex chromium compound thus obtained is isolated by neutralizing with dilute acetic acid and adding sodium chloride and filtered off.

To prepare the monochloro-triazine derivative the resulting moist 2:1 chromium compound is stirred in 200 parts of water and adjusted with sodium hydroxide solution to pH=7. At 0–5° C., with good stirring, a solution of 18.5 parts of cyanuric chloride in a little acetone is added, and the pH is maintained at 7 by dropping in 50 parts of 2 N-sodium hydroxide solution.

To exchange the second chlorine atom of the cyanuric chloride for an amino group, the reaction mixture is treated with 100 parts of 2 N-ammonia solution and stirred for 3 hours at 35–40° C. The dyestuff is isolated with sodium chloride, filtered off and dried at 50° C.

The new dyestuff gives on cellulose fibers by the method according to Example 24 reddish blue tints of good fastness to washing and light.

Example 19

48.4 parts of the monoazo dyestuff obtained by alkaline coupling of diazotized 1-hydroxy-6-nitro-2-aminobenzene-4-sulfonic acid with 2-amino-6-hydroxynaphthalene-8-sulfonic acid are dissolved at 70–80° C. in 700 parts of water. 16.4 parts of anhydrous sodium acetate and 100 parts by volume of 1-molar copper sulfate solution are then added, and the temperature is maintained for 1 hour at 70–80° C. The copper complex is isolated with sodium chloride, filtered off and washed on the filter with salt water.

To manufacture the monochloro-triazine derivative the complex copper compound thus obtained is stirred in 400 parts of water, adjusted to pH=7 with sodium hydroxide solution, and condensed with the primary condensation product from 17.3 parts of 1-aminobenzene-3-sulfonic acid and 18.5 parts of cyanuric chloride according to Example 11.

The new dyestuff produces on cellulose fibers by the processes described in Examples 23 and 24 violet grey tints of good fastness to washing and light.

Example 20

51.9 parts of the monoazo dyestuff obtained by alkaline coupling of diazotized 1-hydroxy-2-aminobenzene-4-sulfonic acid with 1-amino-8-hydroxynaphthalene-3:6-disulfonic acid are dissolved in 500 parts of water at 80° C., and 120 parts of a solution of sodium chrome-salicylate (chromium content 2.6%) are added. Refluxing for 4 hours completes the chroming.

To manufacture the monochloro-triazine derivative the dyestuff solution of the 2:1 complex chromium compound is cooled to 0° C. and adjusted to pH=7. At 0–5° C., with good stirring, a solution of 18.5 parts of cyanuric chloride in a little acetone is added, and the pH is maintained at 7 by dropping in 50 parts of 2 N-sodium hydroxide solution.

To exchange the second chlorine atom of the cyanuric chloride for an amino group 100 parts of 2 N-ammonia solution are added to the reaction mixture which is then stirred for 3 hours at 35–40° C. Evaporation in vacuo at 40–50° C. yields a dark-blue powder which dyes cellulose fibers by the method described in Example 24 blue tints of good fastness properties.

Example 21

43.9 parts of the monoazo dyestuff obtained by alkaline coupling of diazotized 1-hydroxy-2-aminobenzene-4-sulfonic acid with 2-amino-5-hydroxynaphthalene-7-sulfonic acid are dissolved in 500 parts of water with the addition of 100 parts of 2 N-sodium hydroxide solution at 70° C., and 100 parts of a cobalt sulfate solution (cobalt content 3.25%) are added. Stirring for ½ hour at 70–80° C. completes the cobalting.

The complex cobalt compound is isolated by neutralizing with dilute acetic acid and adding sodium chloride and filtered off.

To prepare the monochloro-triazine derivative the resulting moist 2:1 cobalt compound is stirred in 200 parts of water, adjusted with sodium hydroxide solution to pH=7, and condensed with the primary condensation product from 17.3 parts of 1-aminobenzene-3-sulfonic acid and 18.5 parts of cyanuric chloride as described in Example 11.

The new dyestuff produces on cellulose fibers by the process described in Example 24 reddish brown tints of good fastness to washing and light.

Example 22

43.9 parts of the monoazo dyestuff obtained by alkaline coupling of diazotized 1-hydroxy-2-aminobenzene-4-sulfonic acid with 2-amino-5-hydroxynaphthalene-7-sulfonic acid are dissolved in 500 parts of water at 80° C., and 120 parts of a solution of sodium chrome-salicylate (chromium content 2.6%) are added. Refluxing for 4 hours completes the chroming.

The resulting complex chromium compound is isolated by neutralizing with dilute acetic acid and salting out with sodium chloride and filtered off.

To manufacture the monochloro-triazine derivative the resulting moist 2:1 chromium compound is stirred in 200 parts of water, adjusted to pH=7 with sodium hydroxide solution, and condensed with the primary condensation product from 17.3 parts of 1-aminobenzene-3-sulfonic acid and 18.5 parts of cyanuric chloride according to Example 11.

The new dyestuff produces on cellulose fibers by the method described in Example 24 currant tints of good fastness to washing and light.

A dyestuff yielding a similar shade is obtained when 1-hydroxy-2-aminobenzene-4-sulfonic acid is replaced by an equivalent amount of 1-hydroxy-2-aminobenzene-4-sulfonamide.

Example 23

2 parts of the dyestuff according to Example 2, which in the form of the free acid, corresponds to the formula

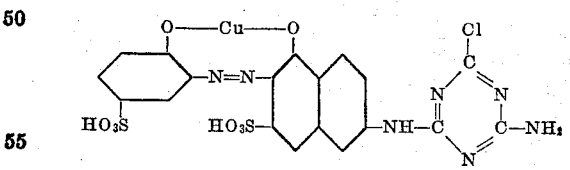

are dissolved by being boiled in 100 parts of water.

The solution is added to 3900 parts of cold water, 40 parts of trisodium phosphate and 80 parts of sodium chloride are added, and 100 parts of cotton fabric is entered in this dyebath.

The temperature is raised to 90° C. in the course of 45 minutes, after 30 minutes another 80 parts of sodium chloride being added. The temperature is maintained for 30 minutes at 90° C., the dyeing is rinsed and soaped for 15 minutes in a boiling 0.3% solution of a non-ionogenic detergent, rinsed and dried.

A ruby red dyeing, fast to washing and light, is obtained.

Example 24

2 parts of the dyestuff obtained as described in Example 2 are dissolved in 100 parts of water. A spun-rayon fabric is impregnated with the solution thus prepared to an increment in weight of 75%, and then dried.

The fabric is then impregnated with a solution having a temperature of 20° C. and containing per liter 10 grams of sodium hydroxide and 300 grams of sodium chloride, squeezed to an increment in weight of 75%, steamed for 60 seconds at 100–101° C., rinsed, soaped for 15 minutes in a boiling 0.3% solution of a non-ionogenic detergent, rinsed and dried.

A ruby red dyeing fast to washing and light is obtained.

When a cotton fabric—instead of a spun-rayon fabric—is treated, a similarly good result is obtained.

*Example 25*

1 part of the dyestuff obtained as described in paragraphs 1 and 2 of Example 10 is dissolved in 100 parts of water heated at about 50° C. 1 part of sodium hydroxide and 6 parts of sodium chloride are added to the resulting solution which is used to impregnate a spun rayon fabric so that its weight increase is about 75%. It is then immediately steamed at 100–101° C. for 60 seconds, rinsed, soaped for 15 minutes in a boiling solution of 0.3% strength of a non-ionic detergent, rinsed again and dried.

A greenish yellow dyeing fast to light and washing is obtained.

What is claimed is:

1. A complex metal compound containing one of the metals selected from the group consisting of chromium, copper, nickel and cobalt bound in complex union with an ortho:ortho'-dihydroxymonoazo dyestuff of the formula

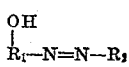

wherein $R_1$ represents a benzene radical bound to the azo linkage in ortho position of the substituent —OH, $R_2$ represents a member selected from the group consisting of a naphtholic and an enolic coupling component bound to the azo linkage in a position vicinal to a hydroxyl group, $R_1$ and $R_2$ having together at least two acid water solubilizing groups and a 2-chloro-4-amino-1:3:5-triazine nucleus which is bound in its 6-position to a member selected from the group consisting of a benzene and a naphthalene radical of the dyestuff molecule and whose mono-amino substituent which is bound by its nitrogen atom in 4-position contains at most 13 carbon atoms and contains, when aromatic, a member selected from the group consisting of a carboxylic acid group and a sulfonic acid group as the only water-solubilizing group.

2. A complex metal compound containing copper bound in complex union with an ortho:ortho'-dihydroxymonoazo dyestuff of the formula

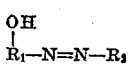

wherein $R_1$ represents a benzene radical bound to the azo linkage in ortho position of the substituent —OH and $R_2$ represents the radical of an amino naphthol sulfonic acid bound to the azo linkage in vicinal position to the hydroxyl group and bound by its amino group to a 2-chloro-4-amino-1:3:5-triazine nucleus whose amino substituent which is bound to its nitrogen atom in 4-position contains at most 6 carbon atoms and a sulfonic acid group when it is aromatic, $R_1$ and $R_2$ containing together at least two sulfonic acid groups.

3. A complex metal compound containing cobalt bound in complex union with an ortho:ortho'-dihydroxymonoazo dyestuff of the formula

wherein $R_2$ represents the radical of a 5-pyrazolone bound to the azo linkage in 4-position and $R_1$ represents a hydroxy benzene radical bound to the azo linkage in ortho position relatively to the hydroxyl group and bound through a —NH— group in 6-position of a 2-chloro-4-amino-1:3:5-triazine ring whose amino group which is bound by its nitrogen atom in 4-position contains at most 6 carbon atoms and a sulfonic acid group when it is aromatic, $R_1$ and $R_2$ containing together at least two sulfonic acid groups.

4. A complex chromium compound of an ortho:ortho'-dihydroxymonoazo dyestuff of the formula

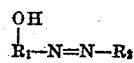

wherein $R_1$ represents a benzene radical bound to the azo linkage in ortho position of the substituent —OH and $R_2$ represents the radical of an amino naphthol sulfonic acid bound to the azo linkage in vicinal position to the hydroxyl group and bound by its amino group to a 2-chloro-4-amino-1:3:5-triazine nucleus whose amino substituent which is bound by its nitrogen atom in 4-position contains at most 6 carbon atoms and a sulfonic acid group when it is aromatic, $R_1$ and $R_2$ containing together at least two sulfonic acid groups.

5. A complex copper compound according to claim 2, wherein the amino group in 4-position of the said triazine nucleus is an $NH_2$-group.

6. A complex copper compound according to claim 2, wherein the amino group in 4-position of the said triazine nucleus is the radical of an aminobenzene-sulfonic acid.

7. A complex chromium compound according to claim 4, wherein the amino group in 4-position of the said triazine nucleus is the radical of an aminobenzene sulfonic acid.

8. A complex cobalt compound according to claim 3, wherein the amino group in 4-position of the said triazine nucleus is the $NH_2$-group.

9. The complex copper compound of the monoazo dyestuff which in its free acid state corresponds to the formula

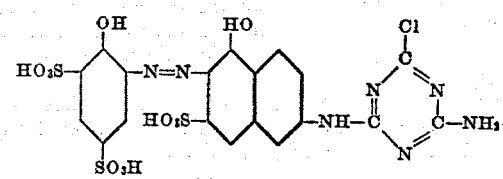

10. The complex copper compound of the monoazo dyestuff which in its free acid state corresponds to the formula

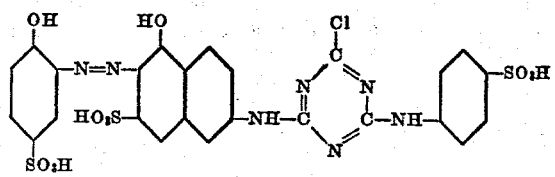

11. The complex copper compound of the monoazo dyestuff which in its free acid state corresponds to the formula

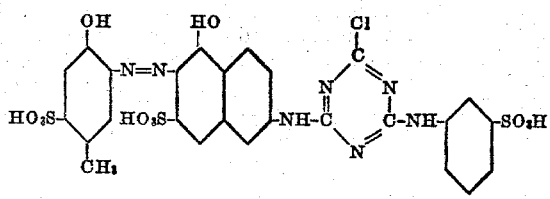

12. The complex copper compound of the monoazo dyestuff which in its free acid state corresponds to the formula

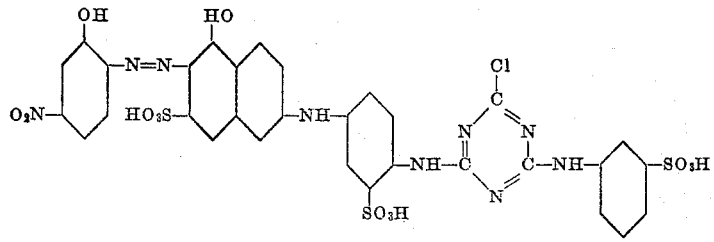

13. The complex cobalt compound containing one atom of cobalt bound in complex union with two molecules of the monoazo dyestuff which in its free acid state corresponds to the formula

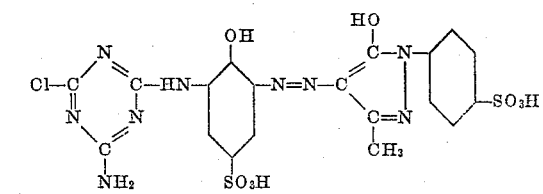

14. The complex chromium compound containing one atom of chromium bound in complex union with two molecules of the monoazo dyestuff which in its free acid state corresponds to the formula

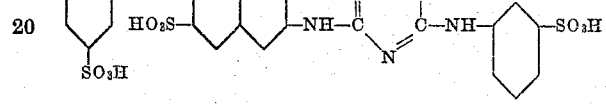

References Cited in the file of this patent

UNITED STATES PATENTS

| | | |
|---|---|---|
| 1,779,298 | Straub et al. | Oct. 21, 1930 |
| 1,867,451 | Gyr | July 12, 1932 |
| 2,795,576 | Fasciati | June 11, 1957 |

FOREIGN PATENTS

| | | |
|---|---|---|
| 200,908 | Australia | Feb. 15, 1956 |